(12) United States Patent
Eberlein et al.

(10) Patent No.: US 9,183,540 B2
(45) Date of Patent: Nov. 10, 2015

(54) MOBILE DEVICE ANALYTICS ENGINE

(75) Inventors: Peter Eberlein, Malsch (DE); Bare Said, Sankt Leon-ROT (DE)

(73) Assignee: SAP SE, Walldorf (DE)

( * ) Notice: Subject to any disclaimer, the term of this patent is extended or adjusted under 35 U.S.C. 154(b) by 566 days.

(21) Appl. No.: 13/541,437

(22) Filed: Jul. 3, 2012

(65) Prior Publication Data
US 2014/0012799 A1    Jan. 9, 2014

(51) Int. Cl.
| G06F 17/00 | (2006.01) |
| G06F 7/00 | (2006.01) |
| G06Q 10/10 | (2012.01) |
| G06F 17/30 | (2006.01) |

(52) U.S. Cl.
CPC .......... *G06Q 10/10* (2013.01); *G06F 17/30657* (2013.01); *G06F 17/30386* (2013.01); *G06F 17/30424* (2013.01); *G06F 17/30554* (2013.01); *G06F 17/30563* (2013.01); *G06F 17/30864* (2013.01); *G06F 17/30967* (2013.01)

(58) Field of Classification Search
None
See application file for complete search history.

(56) References Cited

U.S. PATENT DOCUMENTS

| 8,126,750 B2 * | 2/2012 | Tien et al. ..................... 705/7.11 |
| 2002/0091712 A1 * | 7/2002 | Martin et al. ................. 707/200 |
| 2002/0111949 A1 * | 8/2002 | Barga et al. ..................... 707/10 |
| 2007/0136264 A1 * | 6/2007 | Tran ................................... 707/4 |
| 2008/0281787 A1 * | 11/2008 | Arponen et al. .................. 707/3 |
| 2010/0039247 A1 * | 2/2010 | Ziegler et al. ................. 340/436 |
| 2010/0191590 A1 * | 7/2010 | Hakkarainen et al. ..... 705/14.23 |
| 2011/0208808 A1 | 8/2011 | Corbett |
| 2011/0258049 A1 * | 10/2011 | Ramer et al. ............... 705/14.66 |
| 2012/0185349 A1 * | 7/2012 | Soroca et al. ................ 705/26.3 |
| 2013/0012180 A1 * | 1/2013 | Backholm et al. ............ 455/418 |
| 2013/0018939 A1 * | 1/2013 | Chawla et al. ................ 709/203 |
| 2013/0174237 A1 * | 7/2013 | Zises ................................ 726/7 |
| 2013/0262203 A1 * | 10/2013 | Frederick et al. .......... 705/14.12 |

OTHER PUBLICATIONS

Extended European Search Report for EP Application No. 12007796.1, mailed Mar. 1, 2013, 8 pages.

* cited by examiner

*Primary Examiner* — Dung K Chau (74) *Attorney, Agent, or Firm* — Brake Hughes Bellermann LLP (57) ABSTRACT

A mobile computing platform for a mobile device, which has an interface for a remote connection to a backend server, includes a mobile analytics engine. The mobile analytics engine is configured to implement a mobile analytics model, which defines data, query and report structures for analytics of business data stored on the backend server. The mobile analytics engine uses model metadata to provide a generic reporting and analytics interface to support diverse mobile business analytics applications.

20 Claims, 5 Drawing Sheets

Aggregation Level Configuration — 300

| Attribute | Aggregation Grad |
|---|---|
| Customer ID | Low |
| Location | Medium |
| Region | High |
| Country | High |
| Sales Order | Low |
| Product | Medium |
| Total Amount | - |
| Calendar Week | low |
| Month | Medium |
| Year | High |

Network Connections — 310

| Connection Type | Transfer Capacity |
|---|---|
| Offline | 0 |
| WIFI | High |
| G3 | Medium |
| E | Low |

MOBILE DEVICE ANALYTICS ENGINE

BACKGROUND

Mobile and connected devices (e.g., smart phones, tablets, etc.), which provide Internet connectivity to device users on the move, are transforming patterns of social and business behavior. Consumers are increasingly integrating mobile behaviors into their lifestyles. There is a growing use of mobile applications, not merely mobile browsers, for diverse purposes. Business applications (e.g., transactional business applications) have become relevant to mobile device use. As use of mobile devices continues to grow, consumers may expect business applications running on the mobile devices to have increasing functions and capabilities. The functions and capabilities of applications running on mobile computing platforms may be affected by features (e.g., limited data transfer rates, limited processing power, and temporary and unpredictable connectivity to the web) that are associated with the mobile devices. Yet, consumers may expect applications running on the mobile devices to have the same or similar capabilities as applications running on larger or immobile enterprise computing platforms. For example, consumers may want business applications running on mobile computing platforms to have the same analytical features or capabilities (e.g., reports or queries) associated with business applications (e.g., reporting or descriptive analytics, modeling or predictive analytics, data-driven strategy, clustering, affinity grouping, etc.) running on enterprise computing platforms.

Each mobile business application running on a mobile device may be affected differently and respond differently to operating conditions and features (e.g., limited data transfer rates, limited processing power, and temporary and unpredictable connectivity to the web) that are associated with the mobile devices.

Consideration is now being given to a common infrastructure for development of business applications on mobile computing platforms.

SUMMARY

A mobile analytics engine implements a business analytics model on a mobile device having an interface for a remote connection to a backend server. The mobile analytics engine uses metadata models to dynamically modify query or report content for optimized query or report execution under resource constraints or limitations (e.g. bandwidth, connection status, processing power, device memory, etc.) of the mobile device.

The mobile analytics engine provides analytics and reporting data to a presentation layer of the mobile devices. The mobile analytics engine uses report and analytics metadata objects defined in a mobile metadata repository to present a generic interface to support diverse mobile business analytics applications.

In one general aspect, a mobile computing platform for a mobile device includes an interface for a remote connection to a backend server. A business analytics metadata model and models define data, query and report structures for analytics of business data stored on the backend server. The mobile computing platform includes a mobile analytics engine and a metadata repository. The mobile analytics engine is configured to implement the business analytics model and provide a reporting and analytics interface to a mobile business application using metadata model and models stored in a metadata repository.

In another aspect, the analytics engine is configured to modify a query according to a data transfer capacity of the remote connection to the backend server.

In one general aspect, a method includes implementing a business analytics model on a mobile device having an interface for a remote connection to a backend server. The business analytics model defines data, query and report structures for analytics of business data stored on the backend server. The method further includes providing a generic interface to support a mobile business analytics application by using a metadata model to process reporting and analytics functions of the mobile business analytics application. Implementing the business analytics model includes modifying a query or report according to a data transfer capacity of the remote connection to the backend server.

In one general aspect, a computer program product embodied in non-transitory computer-readable media includes executable code, which when executed implements a business analytics model on a mobile device having an interface for a remote connection to a backend server, and provides a generic interface to support a mobile business analytics application by using model metadata to process reporting and analytics functions of the mobile business analytics application.

The details of one or more implementations are set forth in the accompanying drawings and the description below. Other features will be apparent from the description and drawings, and from the claims.

DETAILED DESCRIPTION

A mobile business analytics application may provide a mobile device user with functions (e.g., analytics, reporting, or query functions) for analytics of business data, which may be stored on one or more remote servers. The mobile device may be remotely connected to the one or more remote servers via wireless network connections (e.g. a G3, UMTS or Wi-Fi connection) that have varying data transfer capacity or are intermittent.

In one example scenario, the mobile device user may use functions of the mobile analytics business application for analytics of, for example, a business organization's product sales data stored on the one or more remote servers.

In accordance with the principles of the disclosure herein, a mobile computing platform provides a generic interface for diverse business analytics applications that may be developed for mobile devices. The mobile computing platform includes a mobile analytics engine interfacing with and supporting diverse business analytics applications. The mobile analytics engine may operate under an analytics model framework. The analytics model may, for example, model or define data or other object structures consumed by the mobile analytics engine for analytics.

The mobile analytics engine may support instant execution of mobile business application functions by dynamically modifying query/report content or features, for example, in response to varying or resource-limited operating conditions of a mobile device. The mobile analytics engine may, for example, modify a query sent to a server to limit an amount of query result data that may have to be retrieved from the server when network connectivity is poor. The mobile analytics engine may modify query/report content or features by reference to a mobile metadata object that may be defined according to the analytics model. The mobile metadata object may contain information or metadata that enables the mobile analytics engine to dynamically optimize the execution of the analytics model (e.g., query/report processing) at runtime. Actual instances of the metadata object may define the data that is or should be retrieved, aggregated or prepared (e.g., by slice and dice processing with pivot tables) for query or report processing.

Figure 1:
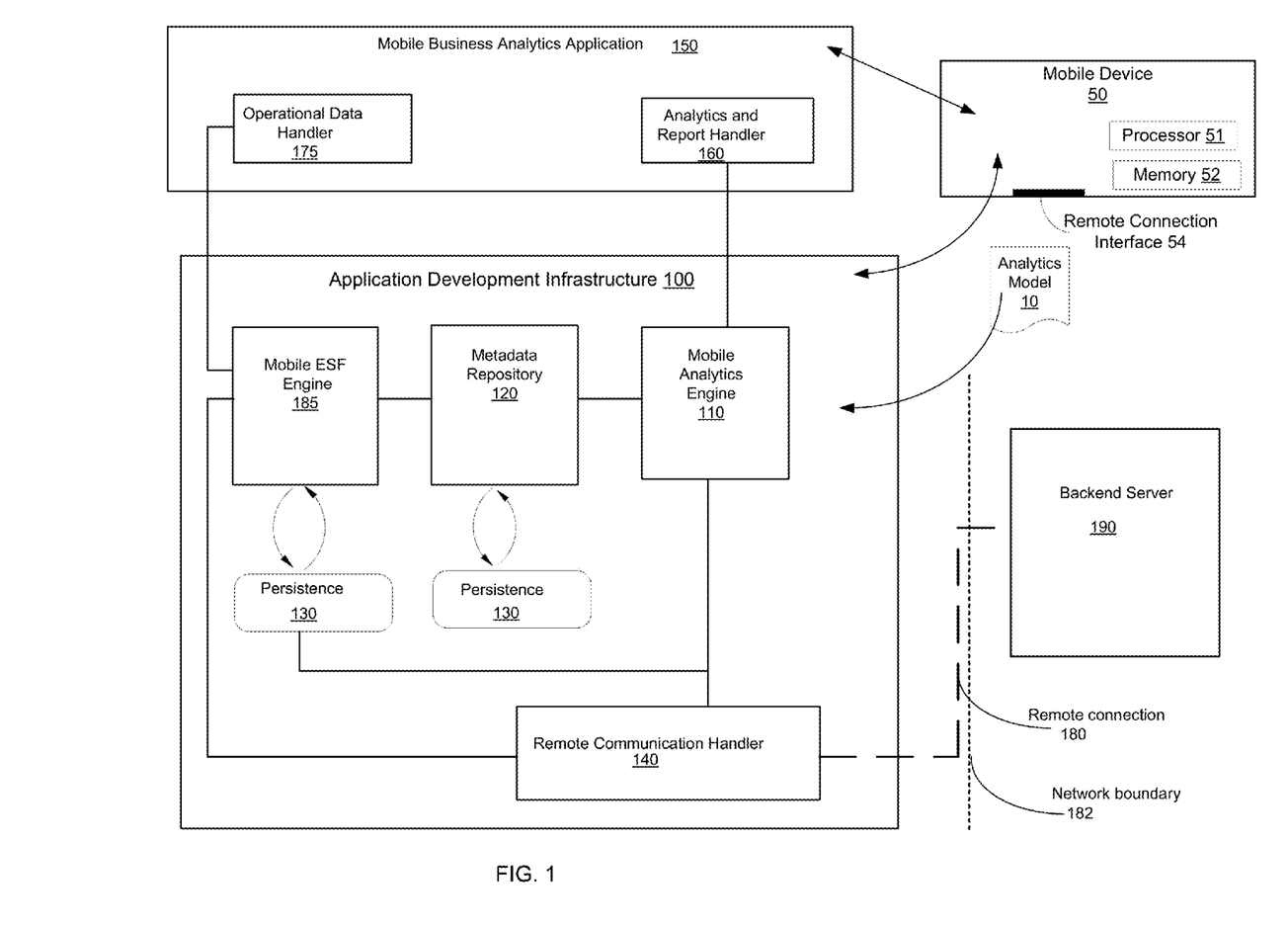
FIG. 1 is a block diagram illustration of an example model-based application development infrastructure of a computing platform for a mobile device, in accordance with the principles of the disclosure herein.

FIG. 1 shows an example "model-based" application development infrastructure 100 of a computing platform for a mobile device, in accordance with the principles of the disclosure herein. FIG. 1 schematically shows an example mobile device 50 on which application development infrastructure 100 may be implemented. Mobile device 50 includes may include a processor 51, a memory 52, and a remote connection interface 54. Application development infrastructure 100, which may be based on a mobile analytics model 10, may include a mobile analytics engine 110 and a metadata repository 120.

Metadata repository 120 may, for example, store model metadata or metadata information objects conforming to analytics model 10 for use by mobile analytics engine 110. Commonly-assigned and co-pending U.S. application Ser. No. 13/311,859, filed Dec. 6, 2011 and entitled "Mobile Metadata Model Repository," describes a metadata repository containing model metadata objects for consumption by a mobile device. Metadata repository 120 coupled to analytics engine 110 here may, for example, be the same or similar to that described in the aforementioned patent application. Metadata repository 120 may also be read/write coupled to a persistence store 130 in the mobile device. Persistence store 130 may a generic store of metadata objects and/or other business objects, which may have been created on the mobile device or replicated from a backend system for local persistence. Persistence store 130 may make the objects data available, for example, when the mobile device offline.

With reference to FIG. 1, mobile device 50 may establish a remote connection 180 (e.g., a G3, UMTS or WIFI connection) via interface 54 to external computing systems (e.g., a backend server 190) across a network boundary 182. The remote connection may, for example, be managed by a remote communication handler 140 in the mobile device. Analytics engine 110 may be communicatively linked by remote communication handler 140 to backend server 190 over remote connection 180.

In application development infrastructure 100, mobile analytics engine 110 may be configured to provide a generic interface to mobile business applications (e.g., mobile business application 150). In particular, mobile analytics engine 110 may be configured to implement analytics model 10 to provide a generic interface to diverse analytics and report handlers (e.g., analytics and report handler 160) of diverse mobile business applications (e.g., mobile business application 150). FIG. 1 shows, for example, analytics and report handler 160 of mobile business application 150 connected to backend server 190 via mobile analytics engine 110.

Application development infrastructure 100 may also include other engines (e.g., mobile enterprise services framework (ESF) engine 195), which, for example, may provide interfaces for other aspects of mobile business applications (e.g., operational data handler 175). For brevity, these other engines or aspects of mobile business applications are not described here in any detail except to note that operational data or other data processed by these other engines may also be available to and used by analytics engine 110. Attention is directed here to the role of analytics engine 110 in providing analytics and reporting data to a presentation layer of the mobile device.

Analytics engine 110 may operate under a framework of mobile analytics model 10. Mobile analytics model 10 may model or define data and data structures for use in reporting and analytics by mobile business applications. Analytics model 10 may, for example, define data attributes that are included in query selection and result structures. Further, analytics model 10 may, for example, rank these data attributes by relative importance (e.g., by business importance in a query result) and correspondingly assign an "aggregation grade" to each data attribute. Mobile specific metadata (e.g., stored in repository 120) may inform analytics engine 110 about the relative importance or aggregation grade of each attribute in the analytics model. Under the model, the aggregation grade of an attribute may, for example, determine the expected amount of result data for that attribute that is desirable in a query result structure (e.g., a report). Analytics engine 110 may accordingly prioritize the transfer of desirable attributes from the backend server 190 to the mobile device depending on available data transfer rates over the remote connection. A result or report structure may be dynamically modified depending on available transfer rate and the aggregation grade of the desirable attributes in the structure.

Further, mobile specific model metadata (e.g., stored in repository 120) may inform analytics engine 110 about query chains. A query chain may, for example, describe relationships between queries. At runtime, analytics engine 110 may be configured to use the description of relationships between queries to optimize a precedent query and/or a subsequent query execution on server 190. Data transferred to the mobile device by the precedent query execution may be reused and merged with the subsequent query result in order to avoid having to perform a full data transfer over the network connection for the subsequent query result.

Further, analytics model 10 may also include "data locality" metadata, which may identify object data available locally on the mobile device itself. The locally available object data may have been obtained, for example, by earlier replication from the server or by local derivation. Analytics engine 110 may exploit the data locality metadata to use the locally available data in lieu of, or to supplement, data transfer from the server.

Analytics model 10 may use the data locality and query chains metadata not merely to optimize amounts of data retrieval from the server, but also to handle situations of occasional or intermittent disconnection of the mobile device from the server. In the case of disconnection, analytics features of the mobile business applications may be available, at least partially, to a user depending on the executed analytics model 10 and the data available locally on the mobile device.

In model-based application development infrastructure 100, as noted previously mobile analytics engine 110 may dynamically modify query or report content depending on current conditions related to connectivity, locally available data or other resources (e.g., bandwidth, processing power, available memory). Analytics model 10 may define instances of the metadata objects, and define data that should be retrieved, aggregated or prepared (e.g., for slice and dice processing with pivot tables) by analytics engine 110. Analytics model 10 may define instances of the metadata objects to include information that may be utilized by analytics engine 110 to dynamically optimize execution of the analytics model (e.g. query/report processing) at runtime within the constraints of mobile device resources.

With renewed reference to FIG. 1, mobile analytics engine 110 may support a mobile business application 150, for example, in a business analytics context. The business analytics context may, for example, involve reporting and analytics on product sales data of a business organization. A version or subset of analytics model 10 may be configured for the particular example business analytics context of reporting and analytics on product sales data of the business organization.

Figure 2:
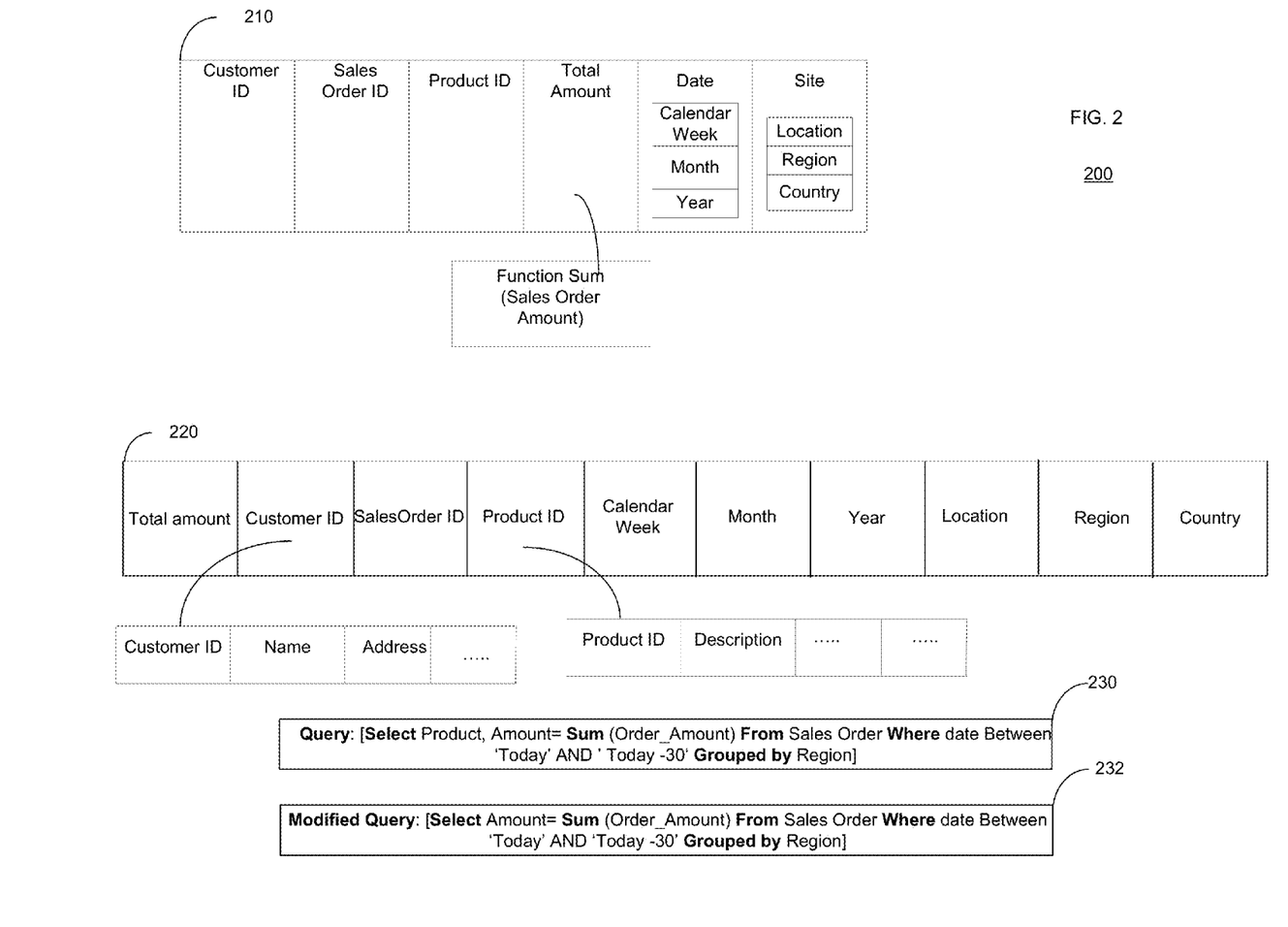
FIG. 2 is an illustration of an example analytics model, in accordance with principles of the disclosure herein.

FIG. 2 shows an example analytics model 200, which may be deployed in the example product sales data context. Analytics model 200 may be a version or subset of analytics model 10. Analytics model 200 may utilize data attributes that originate from three different business objects (e.g., sales order data from a transactional document, customer data from a master data object, and product data from a product data object) on server 190. For the reporting and analytics context, analytics model 200 may include a query "selection" data structure 210 and a query "result" data structure 220. Selection data structure 210, as shown in the figure, may include attributes Customer ID, Sales Order ID, Product ID, Total Amount of Sales, Date (Calendar Week, Month, and Year), and site (Location, Region and Country). The attribute Total Amount may be a Function Sum (Sales Order Amount). Further, result data structure 220, as shown in the figure, may include the attributes Total Amount, Customer ID, Sales Order ID, Product ID, Calendar Week, Month, Year, Location, Region, and Country.

Under the framework of analytics model 200, different queries or reports may be formulated and executed. For example, query 230:
[Select Product, Amount=Sum (Order_Amount) From Sales Order Where date Between 'Today' AND 'Today−30' Grouped by Region],
may be formulated and executed to give a total amount of sales orders by product during the last month grouped by region as a result.

Model metadata and objects of analytics models 10 or 200 may be maintained in the mobile computing platform (e.g., in repository 120/persistence store 130). The maintained model metadata and objects may have been pre-loaded (e.g., by a developer), overwritten by an end-user, or derived locally in the mobile computing platform.

Figure 3:
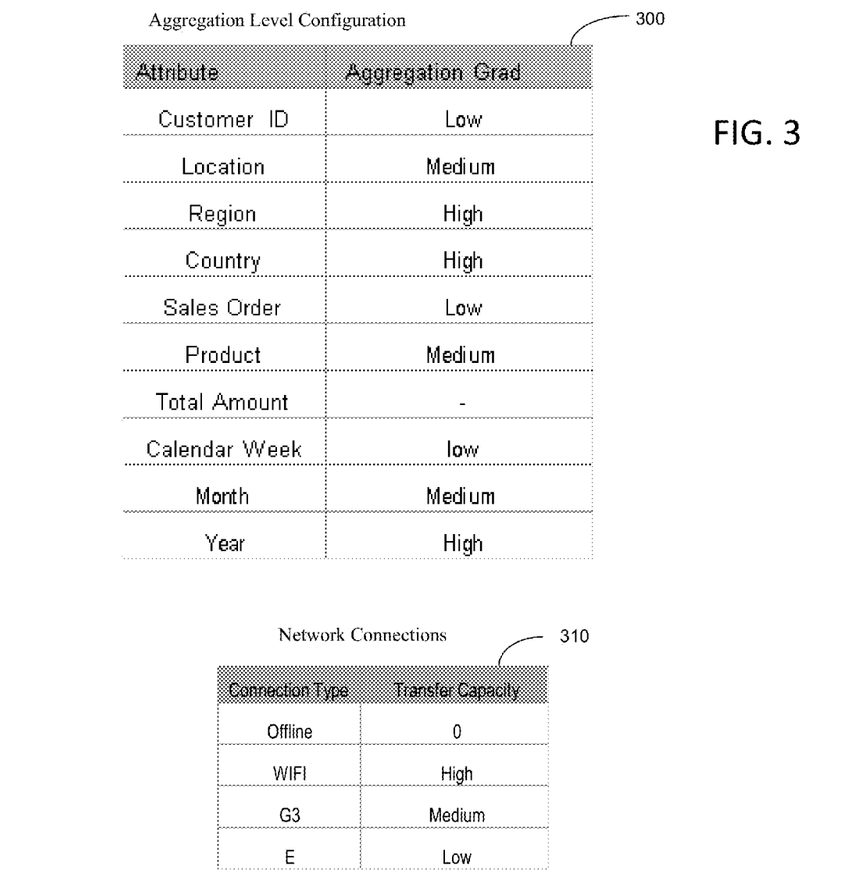
FIGS. 3 and 4 are illustrations of example metadata extensions of the analytics model of FIG. 2, in accordance with the principles of the disclosure herein.

As an example of maintained model metadata and objects for analytics model 200, FIG. 3 shows metadata related to aggregation grades of query attributes (e.g., Customer ID, Location, Region and Country, Sales Order, Product, Total Amount Calendar Week, Month, and Year) listed in an Aggregation Level Configuration table 300, which may be maintained by analytics engine 110/repository 120. FIG. 3 also shows metadata related to device connection types and transfer capacity listed in a Network Connections table 310, which may also be maintained by analytics engine 110/repository 120. Maintained tables 300 and 310 may, for example, be pre-loaded in a mobile device, but may be overwritten by an end user.

Figure 4:
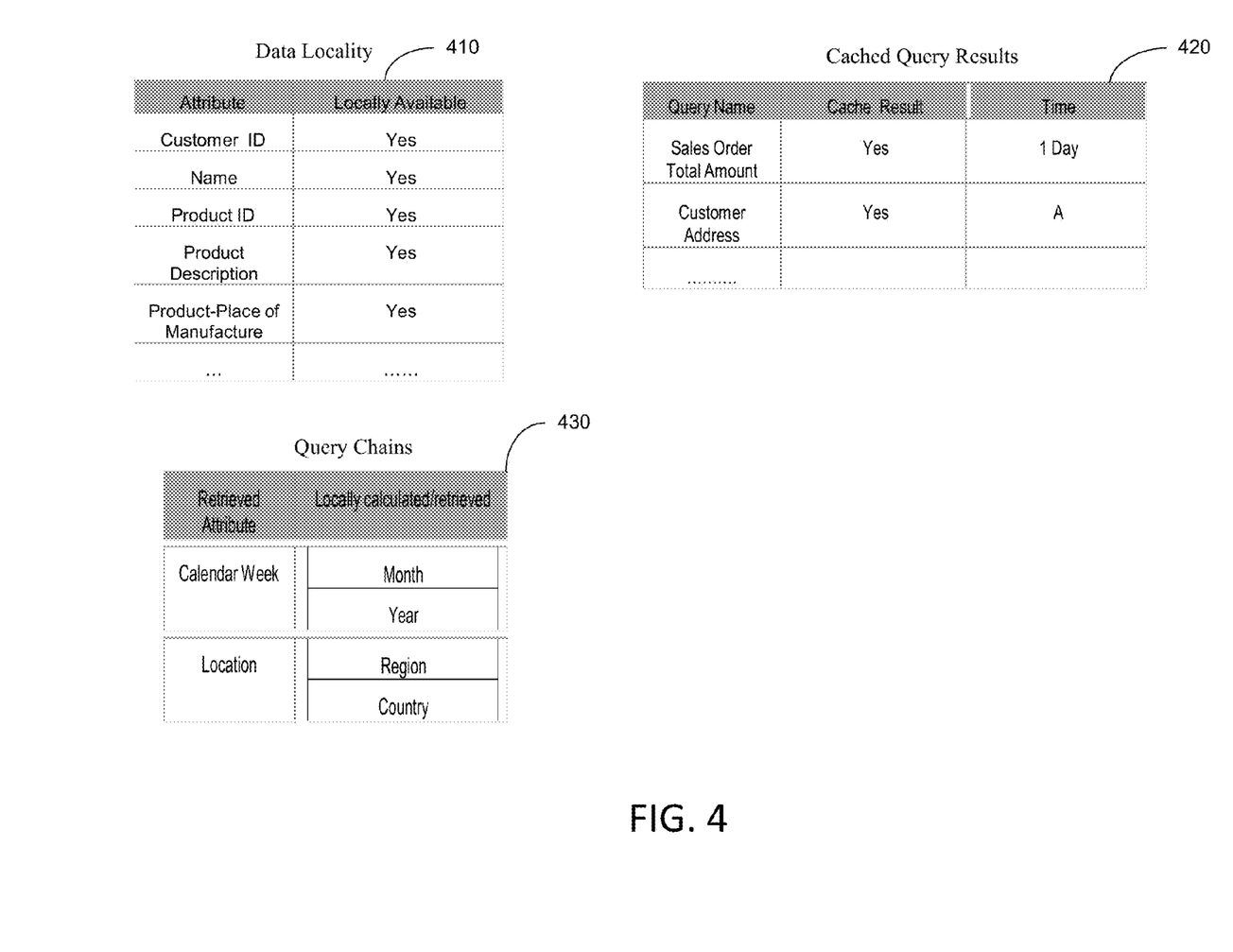

Further, FIG. 4 shows derived metadata related to the local availability of data attributes (e.g., Customer ID, Name, Product ID, Product description, Product-Place of Manufacture) listed in a derived Data Locality table 410, metadata related to the local availability of cached query results (e.g., for queries Sales Order Total Amount and Customer Address, etc.) listed in a Cached Query Results table 420, and metadata related to previously retrieved attributes (e.g., Calendar Week and Location), which may be useful for subsequent query execution, listed in a Query Chains table 430. Metadata tables 410-430 may be derived locally on the mobile device (e.g., by analytics engine 110) and cached or stored in repository 120.

In dynamic operation, mobile analytics engine 110 may rely on maintained and locally derived model metadata (e.g., Tables 300, 310 and 410-430) to optimize query execution, and also to determine a set of enabled query variants that can be executed instantly or completely under a current data transfer capacity of the network connection from the mobile device to the server.

Aggregation Grade

For example, when a mobile device-server network connection has low data transfer capacity (e.g., type "E," Table 430), mobile analytics engine 110 may modify a query, according to the analytics model, to reduce a data amount transferred over the network connection to a minimum. Mobile analytics engine 110 may modify the query, for example, by excluding some data attributes and selecting to keep some data attributes in the query according to their aggregation level (Table 300). Mobile analytics engine 110 may select the data attributes kept in the query to increase the aggregation level (i.e. importance) of potentially retrieved data on backend side.

For example, with respect to the product sales data example of FIG. 2, mobile analytics engine 110 may dynamically modify query 230 by excluding the "Product" attribute, which has an aggregation grade of medium (Table 300). Dynamically modified query 232 may, for example, read:
[Select Amount=Sum (Order_Amount) From Sales Order Where date Between 'Today' AND ' Today−30' Grouped by Region].
As a result of modified query 232, product information will temporarily not be a part of result structure 220 retrieved from the backend server. A number (#) of records retrieved over the network connection for result structure 220 may be reduced from (# Region*# Products) to # Region by the modified query. Data on a total amount of sales orders for the last month may be retrieved by modified query 232 and shown on the mobile device without any product information. Thus, with the dynamically adapted query 232, an end user may be enabled to perform a level of analytics (albeit a reduced level) on the mobile device even under low data transfer rates.

Data Locality: Replicated Data

In another example of the use of model metadata (e.g., derived data locality table 410) mobile analytics engine 110 may also modify a query to reduce the amount of data transferred over a network connection (e.g., a G3 connection). Analytics engine 110 may exploit metadata information (table 410) that product master data may be already available on the mobile device obviating a need to re-transfer the data from the backend server. Mobile analytics engine 110 may, for example, dynamically modify the following query:
[Select Product, Product−Description, Product Place of Manufacture, Amount=Sum (Order_Amount) From Sales Order Where date Between 'Today' AND 'Today−30' Grouped by Region],
to exclude retrieval of data for attributes Product−Description, and Product Place of Manufacture, for which information in the product master data may be available locally to mobile analytics engine 110. The modified query may read: [Select Product, Amount=Sum (Order_Amount) From Sales Order Where date Between 'Today' AND 'Today−30' Grouped by Region].

After the modified query result data or records are retrieved from backend server and transferred to the mobile device, mobile analytics engine 110 may use the locally available product master data to enhance the retrieved records with data for the product description and product place of manufacturer attributes.

Data Locality: Cached Data

In another example of the use of model metadata (e.g., cached query result table 420), mobile analytics engine 110 may use cached results to allow an end user with some querying capabilities even when a network connection to the mobile device is disconnected or offline. The end user may be able to execute a query if the query result is cached and a time limit for cache validity has not expired (Table 420).

Query Chains

In a further example of the use of model metadata and of query optimization with respect to the amount of data transfer required over a network connection, mobile analytics engine 110 may rely on result data calculated or retrieved in a precedent query in a chain of queries to modify a current query. The modification of the current query may take into account resource consumption and connection status. The network connection may, for example, be a Wi-Fi connection having high data transfer rates (Table 310). In which case, for example, the following query:
[Select Product, Amount=Sum (Order_Amount) From Sales Order Where date Between 'Calendar Week 1' AND 'Calendar Week52; Grouped by location, calendar week]
may be executed completely on server side and result records transferred to the mobile device. The transferred records may include a total number #
(# Calendar week*# Location) of records on sales data for each calendar week by location.

In a subsequent query, a mobile device user may be interested only in sales orders created in the last month of the year. Using model metadata (e.g., query chains table 430) mobile analytics engine 110 may dynamically execute the subsequent query locally on the mobile device without involving the backend server. Mobile analytics engine 110 may, for example, aggregate the calendar week results retrieved by the precedent query on a month-by-month basis and present the result for the amount of sales orders created in the last month of the year to the mobile device user. In yet another subsequent query, the mobile device user may be interested in seeing the result grouped by region rather by location. Again using model metadata (e.g., query chains table 430), mobile analytics engine 110 may dynamically execute the subsequent query locally on the mobile device to group the results by region without involving the backend server.

Alternatively, for example, when the mobile device has insufficient random access memory or processing power available for performing calculations locally, mobile analytics engine 110 may take advantage of the high data transfer rates of the WI-Fi connection and forward the subsequent queries to the backend server for execution.

Figure 5:
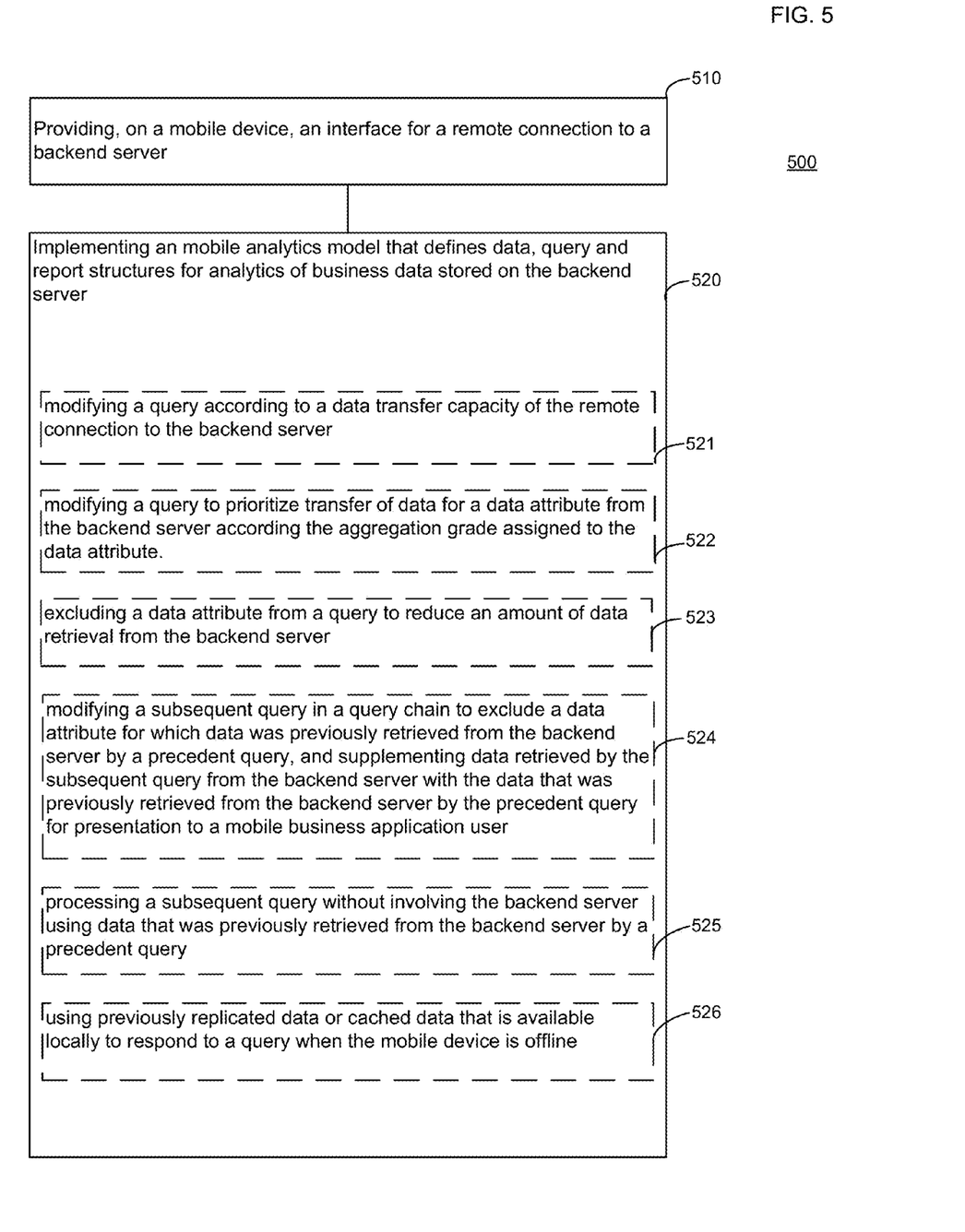
FIG. 5 is a flow diagram illustration of an example method for generically processing reporting and analytics functions of diverse business analytics applications under resource constraints of a mobile device, in accordance with the principles of the disclosure herein.

FIG. 5 shows an example method 500 for generically processing reporting and analytics functions of diverse business analytics applications on a mobile device. The method 500 includes providing, on the mobile device, an interface for a remote connection to a backend server (510), and implementing an analytics model that defines data, query and report structures for analytics of business data stored on the backend server (520). Method 500 provides a generic interfacing process to support a mobile business analytics application by using model metadata to execute reporting and analytics functions of the mobile business analytics application.

In method 500, implementing an analytics model 520 may include modifying a query according to a data transfer capacity of the remote connection to the backend server (521). The analytics model may assign aggregation grades to data attributes, and implementing an analytics model 520 may include modifying a query to prioritize transfer of data for a data attribute from the backend server according the aggregation grade assigned to the data attribute (522).

Further, implementing an analytics model 520 may include excluding a data attribute from a query to reduce an amount of data retrieval from the backend server (523). The excluded data attribute may be a data attribute for which previously replicated data or cached data is available locally in the mobile device.

Alternatively or additionally, implementing an analytics model 520 may include modifying a subsequent query in a query chain to exclude a data attribute for which data was previously retrieved from the backend server by a precedent query, and supplementing data retrieved by the subsequent query from the backend server with the data that was previously retrieved from the backend server by the precedent query for presentation to a mobile business application user (524). Alternatively or additionally, implementing an analytics model 520 may include processing a subsequent query without involving the backend server using data that was previously retrieved from the backend server by a precedent query (525). Further, implementing an analytics model 520 may include using previously replicated data or cached data that is available locally to respond to a query when the mobile device is offline (526).

The various infrastructure, systems, techniques, and methods described herein may be implemented in digital electronic circuitry, or in computer hardware, firmware, software, or in combinations of them. The implementations may be a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data.

Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A mobile device, comprising:
    an interface for a remote connection to a backend server;
    a mobile analytics engine configured to provide a reporting and analytics interface based on a mobile analytics model to a mobile business application; and
    a mobile metadata repository-configured to store metadata related to the mobile analytics model,
    wherein the mobile analytics model defines data, query and report structures for analytics of business data stored on the backend server, and ranks data attributes in the query and report structures by relative importance, and
    wherein the analytics engine prioritizes transfer of data attributes from the backend server to the mobile device depending on the ranking of the data attributes and available data transfer rates over the remote connection.

2. The mobile device of claim 1, wherein the mobile analytics engine on the mobile device is configured to modify a query depending on a data transfer capacity of the remote connection to the backend server.

3. The mobile device of claim 1, wherein the mobile analytics model assigns aggregation grades to data attributes, and wherein the mobile analytics engine on the mobile device is configured to modify a query to prioritize transfer of data from the backend server for a data attribute depending on the aggregation grade assigned to the data attribute.

4. The mobile device of claim 1, wherein the mobile analytics engine on the mobile device is configured to dynamically modify a query by excluding a data attribute to reduce an amount of data retrieval from the backend server.

5. The mobile device of claim 1, wherein the mobile analytics engine on the mobile device is configured to dynamically modify a query by excluding a data attribute for which previously replicated data or cached data is available locally in the mobile device.

6. The mobile device of claim 1, wherein the mobile analytics engine on the mobile device is configured to dynamically modify a subsequent query in a query chain by excluding a data attribute for which data was previously retrieved from the backend server by a precedent query.

7. The mobile device of claim 1, wherein the mobile analytics engine on the mobile device is further configured to supplement data retrieved by the subsequent query from the backend server with the data that was previously retrieved from the backend server by the precedent query for presentation to a mobile business application user.

8. The mobile device of claim 1, wherein the mobile analytics engine on the mobile device is configured to locally process a subsequent query in a query chain without involving the backend server using data that was previously retrieved from the backend server by a precedent query.

9. The mobile device of claim 1, wherein the mobile analytics engine on the mobile device is further configured to use previously replicated data or cached data that is available locally to respond to a query when the mobile device is offline.

10. A method, comprising:
    on a mobile device,
    providing an interface for a remote connection to a backend server; and
    implementing a mobile analytics model to support a mobile business analytics application on the mobile device in conjunction with the mobile metadata repository,
    wherein the mobile analytics model defines data, query and report structures for analytics of business data stored on the backend server, and ranks data attributes in the query and report structures by relative importance,
    wherein implementing the mobile analytics model includes prioritizing transfer of data attributes from the backend server to the mobile device depending on the ranking of the data attributes and available data transfer rates over the remote connection.

11. The method of claim 10, wherein implementing the mobile analytics model includes using model metadata to process reporting and analytics functions of the mobile business analytics application.

12. The method of claim 10, wherein implementing the mobile analytics model includes modifying a query depending on a data transfer capacity of the remote connection to the backend server.

13. The method of claim 10, wherein the mobile analytics model assigns aggregation grades to data attributes, and wherein implementing the mobile analytics model includes modifying a query to prioritize transfer of data for a data attribute from the backend server according the aggregation grade assigned to the data attribute.

14. The method of claim 10, wherein implementing the mobile analytics model includes excluding a data attribute from a query to reduce an amount of data retrieval from the backend server.

15. The method of claim 10, wherein implementing the mobile analytics model includes modifying a subsequent query in a query chain to exclude a data attribute for which data was previously retrieved from the backend server by a precedent query.

16. The method of claim 15, further comprising supplementing data retrieved by the subsequent query from the backend server with the data that was previously retrieved from the backend server by a precedent query for presentation to a mobile business application user.

17. The method of claim 10, wherein implementing the mobile analytics model includes processing a subsequent query on the mobile device without involving the backend server using data that was previously retrieved from the backend server by one or more precedent queries.

18. The method of claim 10, wherein implementing the mobile analytics model includes using previously replicated data or cached data that is available locally on the mobile device to respond to a query when the mobile device is offline.

19. A computer program product embodied in non-transitory computer-readable media that includes executable code, which when executed:

implements a mobile analytics model and a mobile metadata repository on a mobile device having an interface for a remote connection to a backend server; and uses the mobile analytics model in conjunction with the mobile metadata repository to provide a generic interface to support a mobile business analytics application by using model metadata to process reporting and analytics functions of the mobile business analytics application, wherein the mobile analytics model defines data, query and report structures for analytics of business data stored on the backend server, and ranks data attributes in the query and report structures by relative importance, and wherein implementing the mobile analytics model includes prioritizing transfer of data attributes from the backend server to the mobile device depending on the ranking of the data attributes and available data transfer rates over the remote connection.

20. The computer program product of claim 19, which further includes executable code, which when executed:

modifies a query according to a data transfer capacity of the remote connection to the backend server.

* * * * *